United States Patent
Cooley

(10) Patent No.: US 7,197,539 B1
(45) Date of Patent: Mar. 27, 2007

(54) AUTOMATED DISABLEMENT OF DISPOSABLE E-MAIL ADDRESSES BASED ON USER ACTIONS

(75) Inventor: Shaun Cooley, El Segundo, CA (US)

(73) Assignee: Symantec Corporation, Cupertino, CA (US)

( * ) Notice: Subject to any disclaimer, the term of this patent is extended or adjusted under 35 U.S.C. 154(b) by 105 days.

(21) Appl. No.: 10/980,122

(22) Filed: Nov. 1, 2004

(51) Int. Cl.
*G06F 15/16* (2006.01)

(52) U.S. Cl. ....................................... 709/206; 709/203

(58) Field of Classification Search ................ None
See application file for complete search history.

(56) References Cited

U.S. PATENT DOCUMENTS

| | | |
|---|---|---|
| 6,167,434 A | 12/2000 | Pang |
| 6,249,807 B1 | 6/2001 | Shaw et al. |
| 6,282,565 B1 | 8/2001 | Shaw et al. |
| 6,289,416 B1 | 9/2001 | Fukushima et al. |
| 6,324,569 B1 | 11/2001 | Ogilvie et al. |
| 6,487,586 B2 | 11/2002 | Ogilvie et al. |
| 6,493,007 B1 | 12/2002 | Pang |
| 6,546,416 B1 | 4/2003 | Kirsch |
| 6,640,301 B1 | 10/2003 | Ng |
| 6,643,685 B1 | 11/2003 | Millard |
| 6,650,890 B1 | 11/2003 | Irlam et al. |
| 6,654,787 B1 | 11/2003 | Aronson et al. |
| 6,687,740 B1 | 2/2004 | Gough |
| 6,691,156 B1 | 2/2004 | Drummond et al. |
| 6,697,942 B1 | 2/2004 | L'Heureux |
| 6,701,347 B1 | 3/2004 | Ogilvie |
| 6,711,608 B1 | 3/2004 | Ogilvie |
| 6,732,157 B1 | 5/2004 | Gordon et al. |
| 6,757,713 B1 | 6/2004 | Ogilvie et al. |
| 6,757,830 B1 | 6/2004 | Tarbotton et al. |
| 2002/0087641 A1 | 7/2002 | Levosky |
| 2002/0138581 A1 | 9/2002 | MacIntosh et al. |
| 2003/0149726 A1 | 8/2003 | Spear |
| 2003/0167311 A1 | 9/2003 | Kirsch |
| 2003/0191969 A1 | 10/2003 | Kalsikas |
| 2003/0200334 A1 | 10/2003 | Grynberg |

(Continued)

OTHER PUBLICATIONS

CAUCE.org web pages [online] Coalition Against Unsolicited Commericial Email [retrieved Mar. 17, 2003] Retrieved from the Internet: <URL: http://www.cauce.org/about/problem.shtml>.

(Continued)

*Primary Examiner*—David Wiley
*Assistant Examiner*—J Brett Dennison
(74) *Attorney, Agent, or Firm*—Fenwick & West LLP

(57) ABSTRACT

Methods, apparatuses, and computer-readable media for automatically disabling disposable e-mail addresses based on user actions. A method embodiment for disabling disposable e-mail addresses comprises: receiving (205) at a disposable e-mail address server (DEA server) (330) an e-mail directed to the DEA server (330) via a disposable e-mail address, wherein the disposable e-mail address is associated with an un-aliased e-mail address; adding (220) tracking information to the e-mail; directing the e-mail to a e-mail client; classifying (245) the e-mail as unsolicited e-mail; ascertaining (260) creation data associated with the disposable e-mail address; conveying the creation data for subsequent interpretation; seeking (270) authorization to disable the e-mail address; and upon gaining authorization, directing (275) the DEA server (330) to disable the disposable e-mail address.

26 Claims, 4 Drawing Sheets

U.S. PATENT DOCUMENTS

| | | | |
|---|---|---|---|
| 2003/0220978 | A1 | 11/2003 | Rhodes |
| 2003/0229672 | A1 | 12/2003 | Kohn |
| 2003/0233415 | A1 | 12/2003 | Beyda |
| 2004/0003283 | A1 | 1/2004 | Goodman et al. |
| 2004/0024823 | A1 | 2/2004 | Del Monte |
| 2004/0054887 | A1 | 3/2004 | Paulsen et al. |
| 2004/0064734 | A1 | 4/2004 | Ehrlich |
| 2004/0068534 | A1 | 4/2004 | Angermayr et al. |
| 2004/0073617 | A1 | 4/2004 | Milliken |
| 2004/0093383 | A1 | 5/2004 | Huang et al. |
| 2004/0093384 | A1 | 5/2004 | Shipp |
| 2004/0111480 | A1 | 6/2004 | Yue |
| 2004/0148358 | A1* | 7/2004 | Singh et al. ............... 709/207 |
| 2004/0205173 | A1* | 10/2004 | Hall ............................ 709/223 |
| 2005/0114453 | A1* | 5/2005 | Hardt ......................... 709/206 |

OTHER PUBLICATIONS

Wikipedia.org web pages [online], Wikipedia, [retrieved Mar. 17, 2003] Retrieved from the Internet: <ULR: http://www.wikipedia.org/w/wiki.phintl?title=machine learning and printable=yes>.

Outlook.spambully.com web pages [online] Spam Bully [retrieved Jan. 16, 2003] Copyright 2002, Retrieved from the Internet <URL: http://outlook.spambully.com/about.php>.

How it Works: Spam Recognition, http://www.death2spam.net/docs/classifier.html, retrieved Aug. 18, 2005.

Cavnar, William B. et al., "N-Gram-Based Text Categorization", Proceedings of SDAIR-94, 3rd Annual Symposium on Document Analysis and Information Retrieval, Las Vegas, NV., USA, Apr. 13, 1994.

"N-Gram-Based Text Categorization", 2 pages, downloaded from http://citeseer.ist.psu.edu/68861.html, Aug. 25, 2005 U.S.A.

TextCat Language Guesser, 2 pages, downloaded from http:/odur.let.rug.nl/~vannoord/Textcat/ on Aug. 25, 2005., U.S.A.

Spam Assassin, The Apache SpamAssasin Project, 2 pages, downloaded from http:/spamassasin.apache.org on Aug. 25, 2005, U.S.A.

Basis Technology's Rosette Language Identifier, 2 pages, downloaded from http:/www.basistech.com/language-identification/ on Aug. 25, 2005, U.S.A.

Karp-Rabin algorithm, 3 pages, downloaded from http:/www.igm.univ-mlv.fr/~lecroq/string/node5.html on Sep. 1, 2005, U.S.A.

Rabin-Karp string search algorithm, 5 pages, downloaded from http://en.wikipedia.org/wiki/Rabin-Karp_string_search_alogrithm on Aug. 31, 2005 U.S.A.

The Rabin-Karp algorithm, String searching via Hashing, 5 pages, downloaded from http://www.eecs.harvard.edu/~ellard/Q-97/HTML/root/node43 on Aug. 31, 2005 U.S.A.

"Technical Responses to Spam," Nov. 2003, Taughannock Networks.

Kularski, C., "Compound Procedures for Spam Control," Highland School of Technology, Jan. 2004.

NBEC/NWOCA Anti-Spam Tools, http://home.nwoca.org Jul. 7, 2004.

Cranor, Faith, L., LaMacchia, Brian A., "Spam!" Communications of the ACM, vol. 41, No. 8, pp. 74-83, Aug. 1998. U.S.A.

* cited by examiner

AUTOMATED DISABLEMENT OF DISPOSABLE E-MAIL ADDRESSES BASED ON USER ACTIONS

TECHNICAL FIELD

This invention pertains to the field of disposable e-mail addresses, and particularly to the automatic disablement of disposable e-mail addresses.

RELATED APPLICATION

This application is related to U.S. application Ser. No. 10/979,589 filed Nov. 1, 2004 and titled "Automatic Generation of Disposable E-mail Addresses," which is herein incorporated in its entirety by reference.

BACKGROUND ART

Spam is a type of malicious computer code. It is sometimes referred to as electronic junk mail or junk newsgroup postings. Spam is generally e-mail advertising for some product sent to a mailing list or newsgroup. It can be generally defined as unsolicited and unwanted e-mail or other electronic messages.

In addition to wasting people's time with unwanted e-mail, spam also consumes a lot of network bandwidth. Consequently, there are many organizations, as well as individuals, who have taken it upon themselves to fight spam with a variety of techniques. As the Internet is public, little can be done to prevent spam, just as it is impossible to prevent paper junk mail from arriving in a real mailbox. However, some online services have instituted policies to prevent spammers from spamming their subscribers. One such technique involves using disposable e-mail addresses.

A disposable e-mail address is an alias of a real e-mail account. Oftentimes a web page or other online service of some type requires divulging an e-mail address to complete the transaction or request. Rather than providing a real e-mail address, one or more aliases are created that are used to interact with the requesting entity. From the entity's perspective, the entity has a legitimate e-mail address through which it may communicate. As shown in FIG. 1 (Prior Art), e-mail using a disposable e-mail address is directed to a Disposable E-Mail server (DEA server) 110. In many senses a DEA server operates as any other e-mail server. E-mails directed to the server are routed to the correct recipient. DEA servers operate under the presumption that a single user may have several disposable e-mails. These e-mails may be active or be disabled to help in the control of spam. The DEA server, therefore, first determines 120 whether the disposable e-mail address has been disabled. Typically, upon verification that spam exists, the disposable e-mail address corresponding to the spam is shut down 130 or canceled, stopping the unwanted spam from arriving in the user's inbox. In situations where the disposable e-mail address is active, the DEA server looks up 150 the real or un-aliased e-mail address associated with the disposable e-mail address, and forwards 160 the message to the real e-mail account. Some DEA servers also perform anti-spam checks 140 or apply anti-spam filters. Typically, a disposable e-mail server is interposed between the user or client computer and the regular e-mail server, website, news server, or the like.

Since a single user can have multiple disposable e-mail addresses, having a compromised disposable e-mail address resulting in a deluge of spam or other malicious code does not carry with it the connotations of having to cancel the user's e-mail service, contacting the user's legitimate contacts with a new e-mail address, and so forth. The solution to the compromised e-mail address is as simple as disposing of the disposable e-mail address.

The use of disposable e-mail addresses is not without its challenges. Twenty websites necessitating e-mail addresses to complete the transaction may require the generation of twenty or more aliases. Clearly the number of disposable e-mail addresses can grow quickly. While disposable e-mail servers manage the day to day forwarding of e-mail and other forms of electronic mail to the correct addresses, they still function only as a conduit for the e-mail. The user can still be deluged by an onslaught of unsolicited e-mail, this time sent via several disposable e-mail addresses. Several e-mail clients, such as Microsoft Outlook®, Lotus Notes®, and Eudora® possess options to manage spam. Most allow a user to identify unwanted e-mail as spam, junk mail, or the like, and to move the messages into a separate folder or delete the message entirely. This operation however, takes place locally, and while it may effectively control the contents of a user's inbox it fails to address diminished network bandwidth due to spam's presence. If a user wishes to disable the disposable e-mail address, he or she must communicate such intent with the disposable e-mail server. This duplication of effort, and the tedious nature of keeping track of what disposable e-mail address to delete, reduces the likelihood that the use of disposable e-mail addresses will reduce spam. Furthermore, the user is unaware of the how the originator of the spam obtained the user's e-mail address. While the spam is clearly tied to a disposable e-mail address associated with the user, the user, without significant investigation, is not informed of the originating activity that generated the disposable e-mail address, and thus may continue to support it.

There remains a need to automate the disablement of disposable e-mail addresses and to inform the user of the disposable e-mail address resulting in the spam. The present invention addresses these and other problems, as well as provides additional benefits.

DISCLOSURE OF INVENTION

Methods, apparatuses, and computer-readable media for automatically disabling disposable e-mail addresses based on user actions. A method embodiment for disabling disposable e-mail addresses comprises: receiving (205) at a disposable e-mail address server (DEA server) (330) an e-mail directed to the DEA server (330) via a disposable e-mail address, wherein the disposable e-mail address is associated with an un-aliased e-mail address; adding (220) tracking information to the e-mail; directing the e-mail to a e-mail client; classifying (245) the e-mail as unsolicited e-mail; ascertaining (260) creation data associated with the disposable e-mail address; conveying the creation data for subsequent interpretation; seeking (270) authorization to disable the e-mail address; and upon gaining authorization, directing (275) the DEA server (330) to disable the disposable e-mail address.

BRIEF DESCRIPTION OF THE DRAWINGS

These and other more detailed and specific objects and features of the present invention are more fully disclosed in the following specification, reference being to the accompanying drawings, in which.

DETAILED DESCRIPTION OF THE PREFERRED EMBODIMENTS

The present invention automatically disables disposable e-mail addresses based on a user's network activity. By monitoring a user's interaction with the Internet or other networks and use of an e-mail client, the present invention prompts the user to disable a disposable e-mail address when the user has associated it with spam or other unwanted e-mail content. The present invention can also inform the user of the origin of the unwanted e-mail to empower the user in his or her network selections.

The present invention offers the following advantages over the prior art:

seamlessly integrating the disposal of disposable e-mail addresses with a user's e-mail client;

decreasing the procedural steps required to effectively dispose of a disposable e-mail address from a given sender;

increasing a user's control of spam through effective use of disposable e-mail addresses;

empowering the user's selection of network resources by informing the user of the source of unwanted e-mail solicitation; and improving a user's e-mail and network environment by decreasing the presence of spam.

Spam has become ubiquitous, and, for most people, spam represents the scourge of e-mail. Unfortunately, spam, like junk mail that arrives daily in millions of physical mailboxes, spam is unlikely to disappear. A disposable e-mail address is one of the most effective tools available for fighting spam. The present invention facilitates the use of disposable e-mail addresses by monitoring a user's network activity though his or her e-mail client and actively prompting the user to discard a disposable e-mail address once the user has identified an e-mail as unwanted communications. This may occur by using an e-mail client such as Microsoft Outlook®, whereby the user may designate e-mail as junk mail. Upon the user identifying a specific e-mail as being spam, the present invention communicates with the disposable e-mail server to gain origin information and prompts the user to seek authorization to disable the disposable e-mail address. For the purpose of the present invention, a user may be a human user or a device. A computer, processor, machine, or the like may be a user of electronic message services. Embodiments involving a mechanical or electronic user can automate the authorization to disable disposable e-mail addresses.

Figure 1:
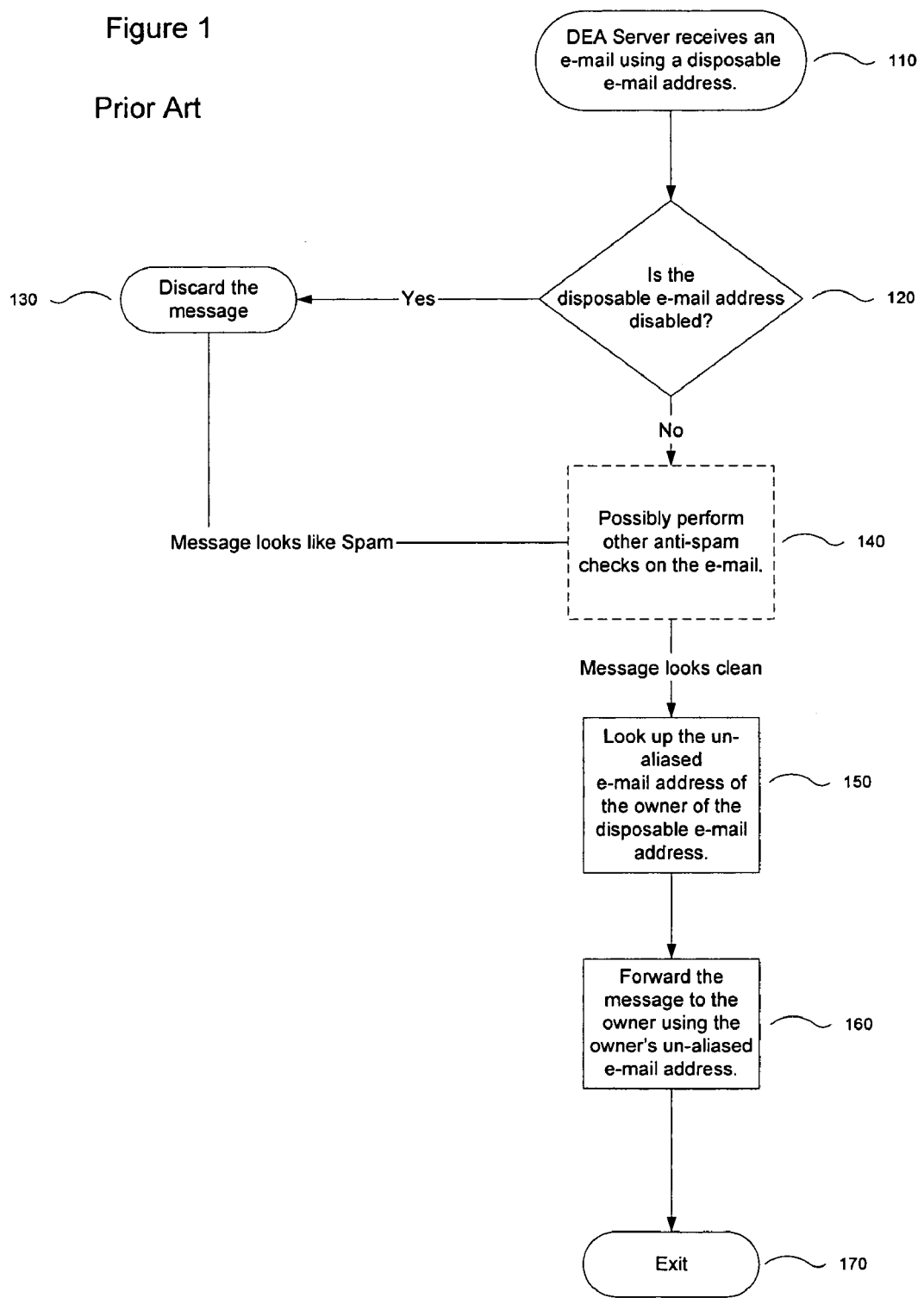
FIG. 1 (Prior Art) is a flow diagram of typical processing of an e-mail message using a disposable e-mail address through a DEA server.
Figure 2:
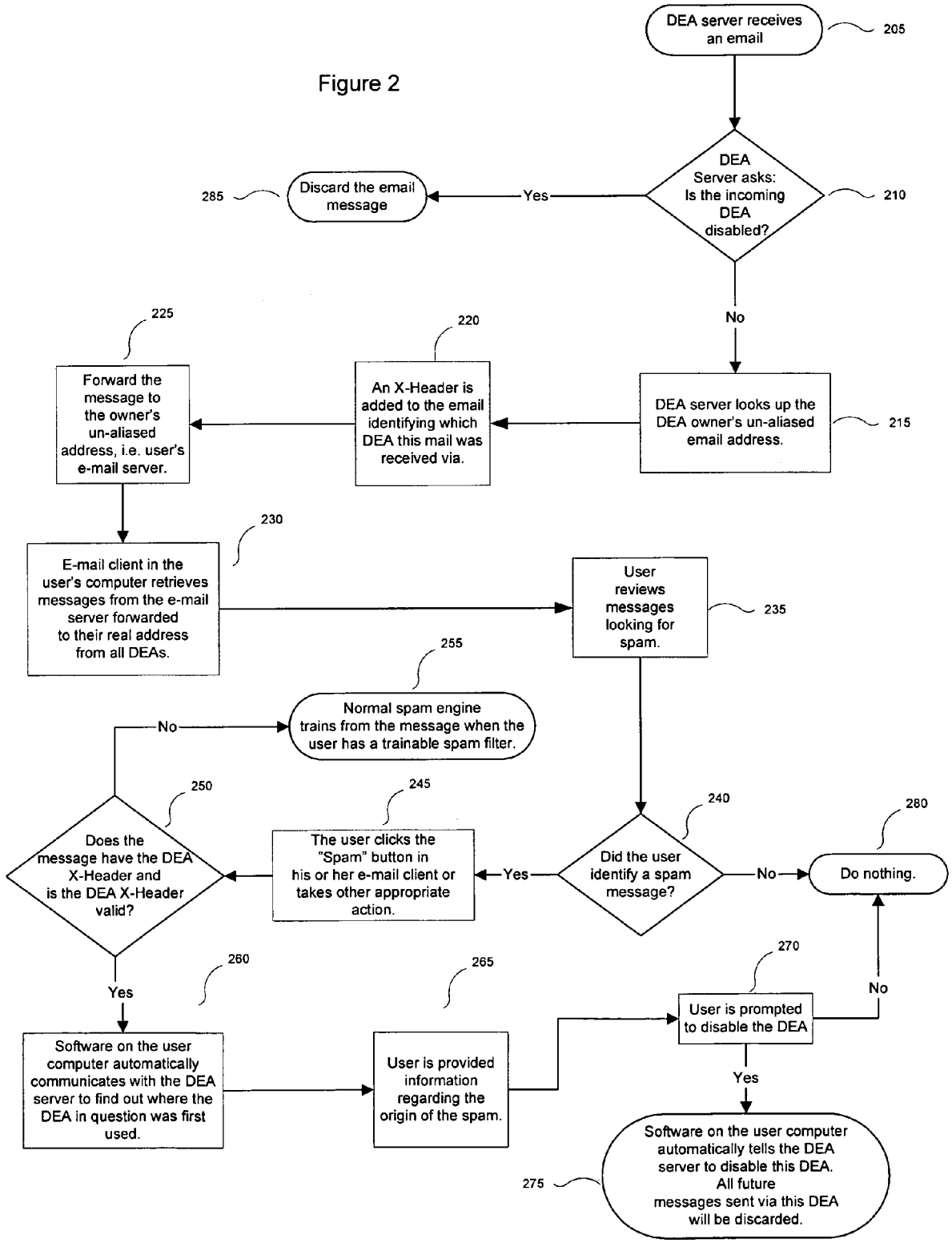
FIG. 2 is a flow diagram of one method embodiment of the present invention for automatically disabling disposable e-mail based on user actions.

FIG. 2 is a flow diagram of one embodiment of a method for disabling a disposable e-mail address based on user actions. As described herein, a disposable e-mail address is an alias of a user's real e-mail address. A disposable e-mail address server ("DEA server") acts as a clearinghouse to receive e-mails directed to disposable e-mail addresses, and to forward the messages to the user's un-aliased e-mail address. As the DEA server receives 205 an e-mail directed to a disposable e-mail address, the DEA server first determines 210 whether the disposable e-mail address has been disabled. If the disposable e-mail address has been disabled, the e-mail message is discarded 285, and the user is not informed of the existence of the e-mail.

In situations where the disposable e-mail address has not been disabled, the DEA server examines 215 its database that correlates disposable e-mail addresses to a user's un-aliased e-mail address. Once the user's un-aliased e-mail address is identified 215, the present invention adds 220 tracking information to the e-mail to identify which disposable e-mail address originally conveyed the e-mail to the DEA server. In one embodiment, the added information is in the form of an X-header which lists a code by which the DEA server 330 can retrieve the correct disposable e-mail address. Network communications taking place via Simple Message Transport Protocol (SMTP), News Network Transfer Protocol (NNTP), and Internet Message Access Protocol (IMAP). These protocols use Multipurpose Internet Mail Extensions (MIME) as a way to convey information regarding individual messages. MIME provides the capability of using X-headers. X-headers enable additional or extra information to be added to the header. According to MIME protocols, X-headers must be forwarded with their corresponding messages. Thus the X-header is a logical place to locate tracking information regarding the e-mail.

For illustration purposes, a typical appended X-header for a manually created disposable e-mail address may take the form of X-DEA-VIA: tops@deaserver.com. Similarly, the X-header for a disposable e-mail address created automatically may take the form of X-DEA-VIA: x24ij34x@deaserver.com. Both of these headers have validation headers such as X-DEA-VALIDATION: {[8 hex character]–[4 hex character]}–{[4 hex character]–[4 hex character]–[12 hex character]}. The validation header prevents tampering of the header information. Additional X-headers can be added to incorporate additional information regarding the e-mail.

Once tagged with tracking information, the e-mail is forwarded 225 to the e-mail server 330 responsible for receiving and managing the user's e-mail account. At this point, the e-mail is treated as any other e-mail directed toward the user's un-aliased e-mail address would be treated. Eventually, the user's e-mail client communicates with the e-mail server and retrieves 230 the user's e-mail. The user's e-mail client may be one of any number of popular e-mail client software products, such as Microsoft Outlook®, Outlook Express®, Eudora®, Lotus Notes®, or the like. Each possesses the capability of communicating with an e-mail server and retrieving messages directed to the user's e-mail address. Once retrieved, the e-mail message is directed to the user's inbox for review 235. The present invention monitors whether the user identifies 240 a message as an unsolicited e-mail, junk mail, spam, or the like. In one embodiment, the present invention hooks a plug-in application to the e-mail client to use the e-mail client's filtering capability. In other embodiments, the detection may be through more independent detection means.

Once the user has identified 240 the e-mail message to the e-mail client as undesirable and unsolicited e-mail (spam), the present invention examines 250 the e-mail for tracking information. In one embodiment, the headers of the e-mail, including the X-header, are examined for tracking information added 220 as the e-mail passed 225 from the DEA server 330 to the e-mail server 320. In other embodiments, tracking information may be embedded in the e-mail content. When the e-mail is found to contain tracking information, the present invention communicates 260 with the DEA server 330 to determine details regarding the relationship between the user's un-aliased e-mail address and the disposable e-mail address. Once provided with the disposable e-mail address, the DEA server 330 can communicate back to the user's computer 350 information such as a log outlining the use of the disposable e-mail address. Such a log may include the originator of the e-mail, the date and time of the transmission, and so forth. The DEA server 330 can also convey to the user's computer 350 the original designation of the disposable e-mail address. Provided with such information 265, the user may identify what entity disclosed or sold the disposable e-mail address to the originator of the unsolicited e-mail. Empowered with such information, users can adjust their patronage accordingly.

When an e-mail designated 245 as spam by the user fails to possess any tracking information, the e-mail, in one embodiment, is directed 255 to a spam engine or trainable spam filter to improve the e-mail client's ability to detect future spam. The trainable filter or spam engine can identify characteristics of e-mails designated by the user as spam to filter future unsolicited e-mail.

Having identified the e-mail as spam, and being provided with information regarding the origin of the e-mail and its relationship with the disposable e-mail address, the user, in one embodiment, is prompted 270 to disable the disposable e-mail address. If the user concurs, the present invention communicates 275 with the DEA server 330 to disable the disposable e-mail address associated with the pending e-mail. As a result, further messages sent to this particular disposable e-mail address will not reach the user's inbox. In another embodiment, the e-mail address is disabled 275 automatically upon the user's determination 245 that the e-mail message is spam, bypassing the need for the user to authorize the disablement of the disposable e-mail address.

Figure 3:
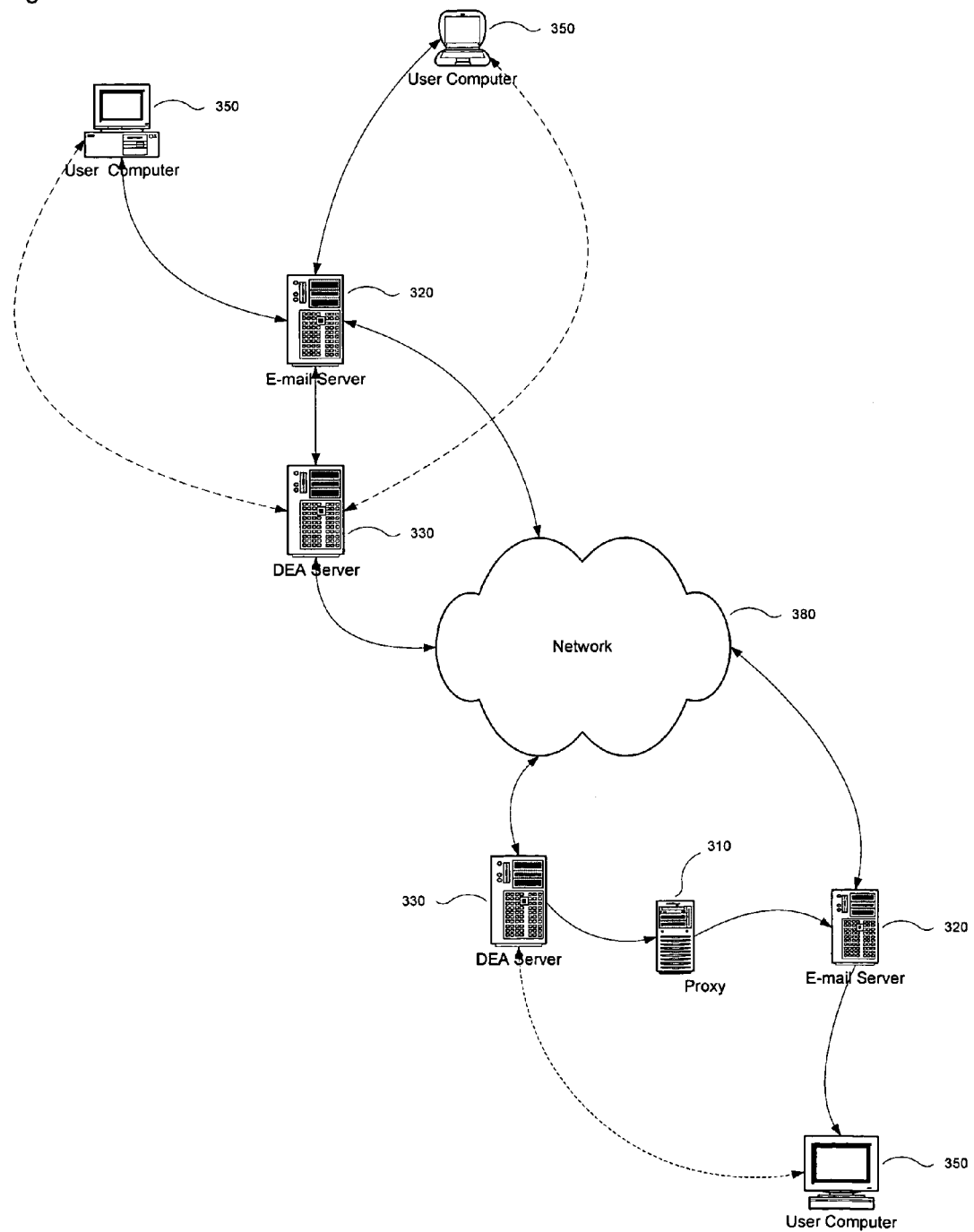
FIG. 3 is a block diagram of one apparatus embodiment of the present invention for automated disablement of disposable e-mail addresses.

FIG. 3 is a block diagram of one embodiment of a network environment configured to disable disposable e-mail addresses based on user inputs. The present invention is contemplated to be equally effective in a remote, distributed, or localized configuration. As shown in FIG. 3, one configuration is to employ a proxy computer 310 interposed between an e-mail server 320 and a DEA server 330. When an e-mail arrives at a DEA server 330 as directed by a disposable e-mail address, and upon verification that the disposable e-mail address is still active, the proxy computer 310 interacts with the DEA server to add 220 tracking information to the e-mail as it is forwarded 225 to the user's e-mail server 320. When the user identifies 245 an e-mail message of this type as spam, a separate component of the present invention communicates 260 directly with the DEA server 330 to ascertain relational and creation information regarding the e-mail in question. A second configuration distributes the functional components of the present invention between a user computer 350 and the DEA server 330. In this embodiment, the ability to add 220 tracking information to the e-mail, once the DEA server 330 has associated it with the user's un-aliased e-mail address, resides on the backend of the DEA server 330. Monitoring the user's action with respect to the designation 245 of e-mails as spam is carried out locally on the user computer 350, as is the capability to communicate 260 with the DEA server 330 to ascertain creation and historical information about the e-mail message. In both configurations, the DEA servers 330 and the e-mail servers 320 are coupled to a network 380 such as the Internet, a LAN, WAN, or similar network configuration.

Figure 4:
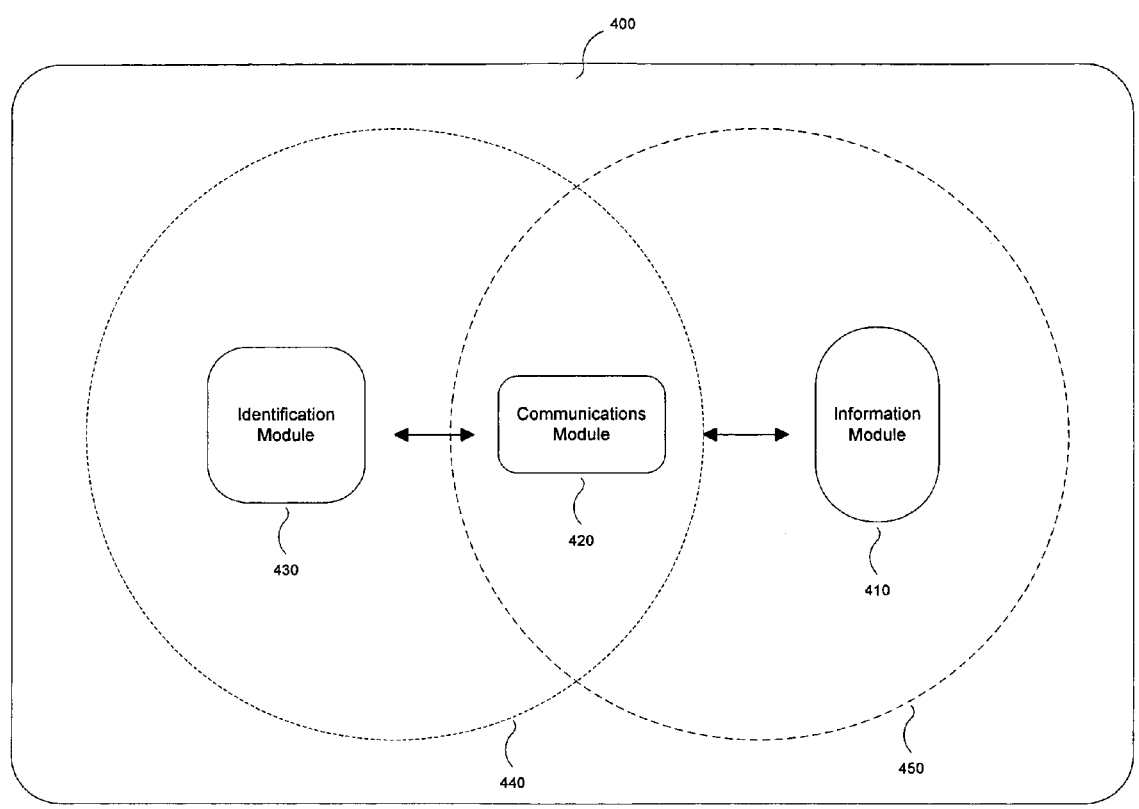
FIG. 4 is a block diagram of a network environment adapted to disable automatically disposable e-mail addresses in accordance with the present invention.

FIG. 4 is a block diagram of an apparatus 400 embodiment for automatically disabling a disposable e-mail address based on user actions. A communications module 420 is interposed between and is communicatively coupled to an information module 410 and an identification module 430. The information module 410 interacts with the DEA server 320 to ascertain whether the disposable e-mail address that directed the e-mail to the DEA server has been disabled 210. In the case where the disposable e-mail address is active, the information module 410 works with the DEA server 320 to add 220 tracking information to the e-mail. With tracking information added 220 to the e-mail, the message is forwarded 225 to the user's e-mail server 320, and in time retrieved 230 by the user's e-mail client.

The identification module 430 resides, in this embodiment, on the user computer 350 and interacts with the e-mail client to monitor whether the user designates 345 the e-mail as spam or an unsolicited e-mail message. Upon such a designation 345, the identification module 430 interacts with the communication module 420 to gain detailed information about the creation and history of the disposable e-mail address that directed the e-mail first to the DEA server 330, then to the user's e-mail server 320, and ultimately to the user's inbox. The communications module 420 conveys creation and historical information to the identification module 430, which provides 265 the user with data to determine whether the disposable e-mail address should be disabled. In the event the user elects to disable the disposable e-mail address, the communications module 420 conveys 275 the direction to the DEA server 320.

The communication modules' 420 interaction with the information module 410 and the identification module 430 allows the apparatus' functionality to be distributed between the DEA server 320 and the user computer 350. This is depicted on FIG. 4 as the intersection of two Venn diagrams. A first association 440 shows the interaction between the communication module 420 and the identification module 430, and a second association 450 illustrates the interaction between the communication module 420 and the information module 410.

While it is contemplated that the present invention will be used on network computers, it is possible to apply the methodology presented here to network environments with multiple computers in several locations. Although not required, method embodiments of the invention can be implemented via computer-executable instructions, such as routines executed by a general purpose computer, e.g., a server or client computer. The computer-executable instructions can be embodied in hardware, firmware, or software residing on at least one computer-readable medium, such as one or more hard disks, floppy disks, optical drives, flash memory, Compact Disks, Digital Video Disks, etc. Those skilled in the relevant art will appreciate that the invention can be practiced with other computer system configurations including Internet appliances, hand-held devices, wearable computers, cellular or mobile phones, multi-processor systems, microprocessor-based or programmable consumer electronics, set-top boxes, network PCs, mini-computers, mainframe computers, and the like.

The invention can be embodied in a special purpose computer or data processor that is specifically programmed, configured, or constructed to perform at least one of the computer-executable instructions as explained herein. The invention can also be practiced in distributed computing environments where tasks or modules are performed by remote processing devices linked through a communications network. In a distributed computing environment, program modules may be located in both local and remote memory storage devices. Furthermore, for purposes of this patent application, malicious computer code comprises computer code commonly referred to as computer viruses, worms, Trojan horses, spam, spy-ware, and any other type of unauthorized or unsolicited computer code that appears in or on a computer without an authorized user's knowledge and/or without an authorized user's consent.

The above description is included to illustrate the operation of various embodiments of the invention, and is not meant to limit the scope of the invention. The elements and steps of the various embodiments described above can be combined to provide further embodiments. The scope of the invention is to be limited only by the following claims. Accordingly, from the above discussion, many variations will be apparent to one skilled in the art that would yet be encompassed by the spirit and scope of the present invention.

The invention claimed is:

1. A method for disabling disposable e-mail addresses based on user actions, the method comprising:
   receiving at a disposable e-mail address server (DEA server), an e-mail directed to the DEA server via a disposable e-mail address, wherein the disposable e-mail address is associated with an un-aliased e-mail address;
   adding tracking information to the e-mail;
   directing the e-mail to an e-mail client using the un-aliased e-mail address, wherein the tracking information added to the e-mail is in addition to the un-aliased e-mail address;
   in response to the e-mail being classified as unsolicited e-mail, receiving a communication from a user computer associated with the e-mail client, the communication including the tracking information and for ascertaining creation data associated with the disposable e-mail address;
   using the tracking information to obtain the creation data, and conveying the creation data to the user computer thereby enabling a determination as to whether the disposable e-mail address should be disabled; and
   in response to receiving authorization, disabling the disposable e-mail address.

2. The method of claim 1 wherein the tracking information comprises identification of the disposable e-mail address.

3. The method of claim 1 wherein the tracking information comprises an X-header identifying the disposable e-mail address.

4. The method of claim 1 wherein the tracking information comprises data detailing a relationship between the un-aliased e-mail address and the disposable e-mail address.

5. The method of claim 1 wherein the e-mail is classified as unsolicited e-mail automatically by the e-mail client.

6. The method of claim 1 wherein the e-mail is classified as unsolicited e-mail based on user input.

7. The method of claim 1 wherein ascertaining creation data associated with the disposable e-mail address comprises validating the tracking information.

8. The method of claim 1 wherein the creation data identifies a network destination originally associated with the disposable e-mail address.

9. The method of claim 8 wherein conveying comprises presenting the creation data to a user, thereby identifying the network destination originally associated with the disposable e-mail address.

10. Apparatus for disabling disposable e-mail addresses based on user actions, the apparatus comprising:
    an information module adapted to add tracking information to an e-mail directed to a disposable e-mail address server (DEA server) via a disposable e-mail address, wherein the e-mail is subsequently directed to an e-mail client using an un-aliased e-mail address associated with the disposable e-mail address, and the added tracking information is in addition to the un-aliased e-mail address;
    an identification module adapted to identify whether the e-mail is classified as unsolicited e-mail; and
    communicatively coupled to the information module and to the identification module, a communications module adapted to collect disposable e-mail address creation data from the DEA server using the tracking information and to convey the disposable e-mail address creation data to a user computer upon the classification of the e-mail as being unsolicited.

11. The apparatus of claim 10 wherein the tracking information comprises identification of the disposable e-mail address used to direct the e-mail to the DEA server.

12. The apparatus of claim 10 wherein the tracking information comprises an X-header identifying the disposable e-mail address used to direct the e-mail to the DEA server.

13. The apparatus of claim 10 wherein the tracking information comprises data detailing a relationship between the un-aliased e-mail address and the disposable e-mail address.

14. The apparatus of claim 10 wherein the classification of the e-mail as unsolicited e-mail is accomplished automatically by the e-mail client.

15. The apparatus of claim 10 wherein classification of the e-mail as unsolicited e-mail comprises manually categorizing the e-mail as unsolicited e-mail.

16. The apparatus of claim 10 wherein the identification module is adapted to detect tracking information contained in the e-mail.

17. The apparatus of claim 16 wherein the identification module is adapted to validate tracking information contained in the e-mail.

18. The apparatus of claim 10 wherein the communications module presents creation data of the disposable e-mail address, identifying a network destination originally associated with the disposable e-mail address.

19. At least one computer-readable medium containing computer program instructions for disabling disposable e-mail addresses based on user actions, the computer program instructions performing:
    receiving at a disposable e-mail address server (DEA server), an e-mail directed to the DEA server via a disposable e-mail address, wherein the disposable e-mail address is associated with an un-aliased e-mail address;
    adding tracking information to the e-mail;
    directing the e-mail to an e-mail client using the un-aliased e-mail address, wherein the tracking information added to the e-mail is in addition to the un-aliased e-mail address;
    in response to the e-mail being classified as unsolicited e-mail, receiving a communication from a user computer associated with the e-mail client, the communication including the tracking information and for ascertaining creation data associated with the disposable e-mail address;

using the tracking information to obtain the creation data, and conveying the creation data to the user computer thereby enabling a determination as to whether the disposable e-mail address should be disabled; and in response to receiving authorization, disabling the disposable e-mail address.

20. The at least one computer-readable medium of claim 19 wherein the tracking information comprises identification of the disposable e-mail address.

21. The at least one computer-readable medium of claim 19 wherein the tracking information comprises an X-header identifying the disposable e-mail address.

22. The at least one computer-readable medium of claim 19 wherein the tracking information comprises data detailing a relationship between the un-aliased e-mail address and the disposable e-mail address.

23. The at least one computer-readable medium of claim 19 wherein the e-mail is classified as unsolicited e-mail automatically by the e-mail client.

24. The at least one computer-readable medium of claim 19 wherein the e-mail is classified as unsolicited e-mail based on user input.

25. The at least one computer-readable medium of claim 19 wherein ascertaining creation data associated with the disposable e-mail address comprises validating the tracking information.

26. The at least one computer-readable medium of claim 19 wherein the creation data identifies a network destination originally associated with the disposable e-mail address.

* * * * *